United States Patent [19]

Strem, Jr. et al.

[11] 4,403,805
[45] Sep. 13, 1983

[54] SLIDING SUNROOF WITH POWER OPERATED VENTILATOR

[75] Inventors: Ervin H. Strem, Jr., Warren; Gary L. Van Hulle, Woodhaven, both of Mich.

[73] Assignee: General Motors Corporation, Detroit, Mich.

[21] Appl. No.: 337,474

[22] Filed: Jan. 6, 1982

[51] Int. Cl.$^3$ .................................................. B60J 7/04
[52] U.S. Cl. .................................... 296/221; 296/222; 296/223
[58] Field of Search ............... 296/216, 220, 221, 222, 296/223, 224

[56] References Cited

U.S. PATENT DOCUMENTS

| | | | |
|---|---|---|---|
| 3,981,531 | 9/1976 | Koral et al. | 296/222 |
| 4,085,965 | 4/1978 | Schlapp | 296/221 |
| 4,342,482 | 8/1982 | Koral et al. | 296/221 |

*Primary Examiner*—Robert R. Song
*Assistant Examiner*—Dennis Pedder
*Attorney, Agent, or Firm*—Charles E. Leahy

[57] ABSTRACT

A sunroof for a roof opening defined by a downward facing roof flange includes a rectangular carrier frame which underlies the roof flange and has a central sunroof opening therein. A glass closure panel is connected to the front of the carrier frame by hinges permitting pivoting of the closure panel to an angularly raised ventilator position. A seal mounted on the carrier frame is adapted for vertically compressed sealing engagement with both the roof flange and the closure panel. A track extends longitudinally along each side of the roof opening. A rear guide block slidable along the track is connected to the carrier frame by a lifter link which is pivoted to the carrier frame and stands vertically upright to hold the carrier frame closed against the roof panel and compress the seal therebetween. The lifter link is connected to the rear guide block by a pin and slot connection which permits the lifter link to remain vertically upright and stationary while the rear guide block is driven further forward. A linkage is pivoted to the rear guide block and connects with a cam block attached to the closure panel so that further forward movement of the guide block after the lifter link stops at the vertical upright position causes the linkage to raise the cam block and accordingly pivot the closure panel to an angularly raised ventilating position. Rearward movement of the guide block from the closed position collapses the lifter link to lower the carrier frame and tow the carrier frame and closure panel rearwardly to a stored position beneath the vehicle roof.

4 Claims, 14 Drawing Figures

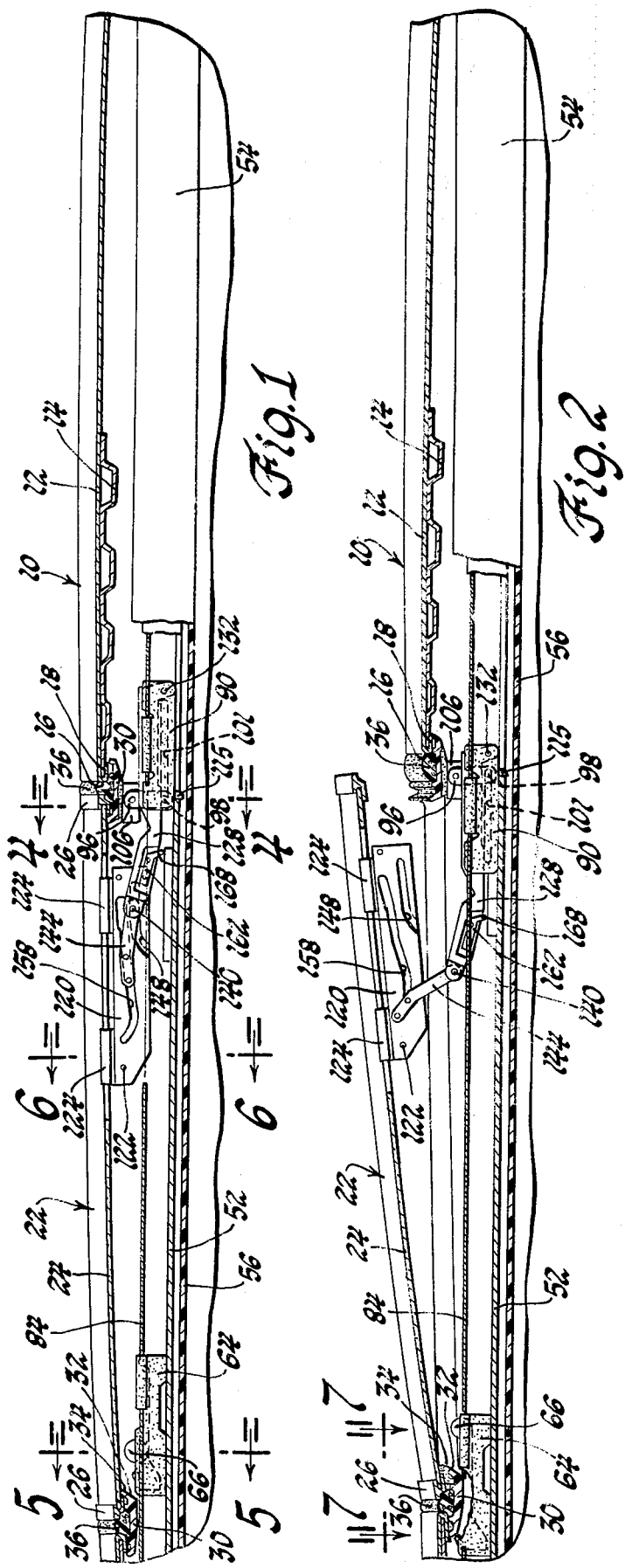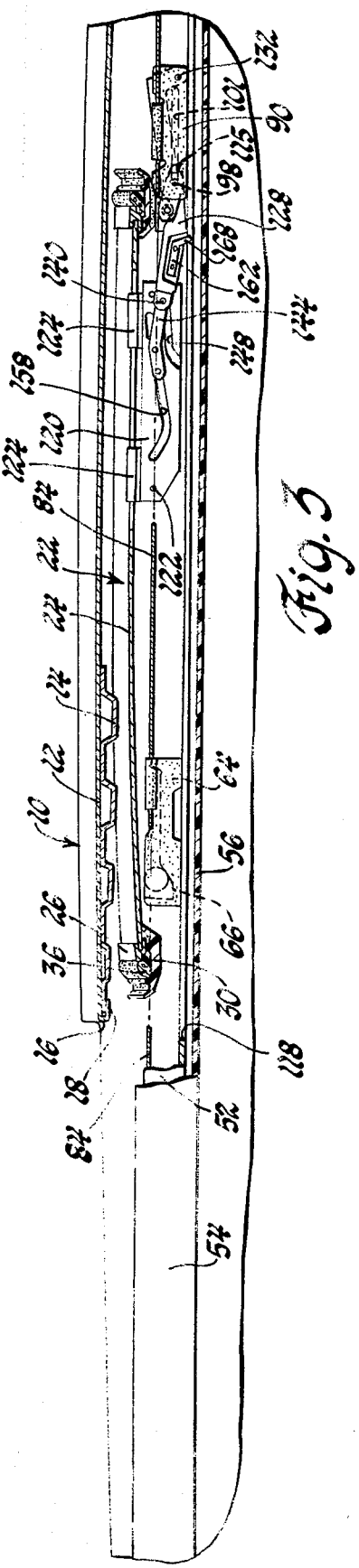

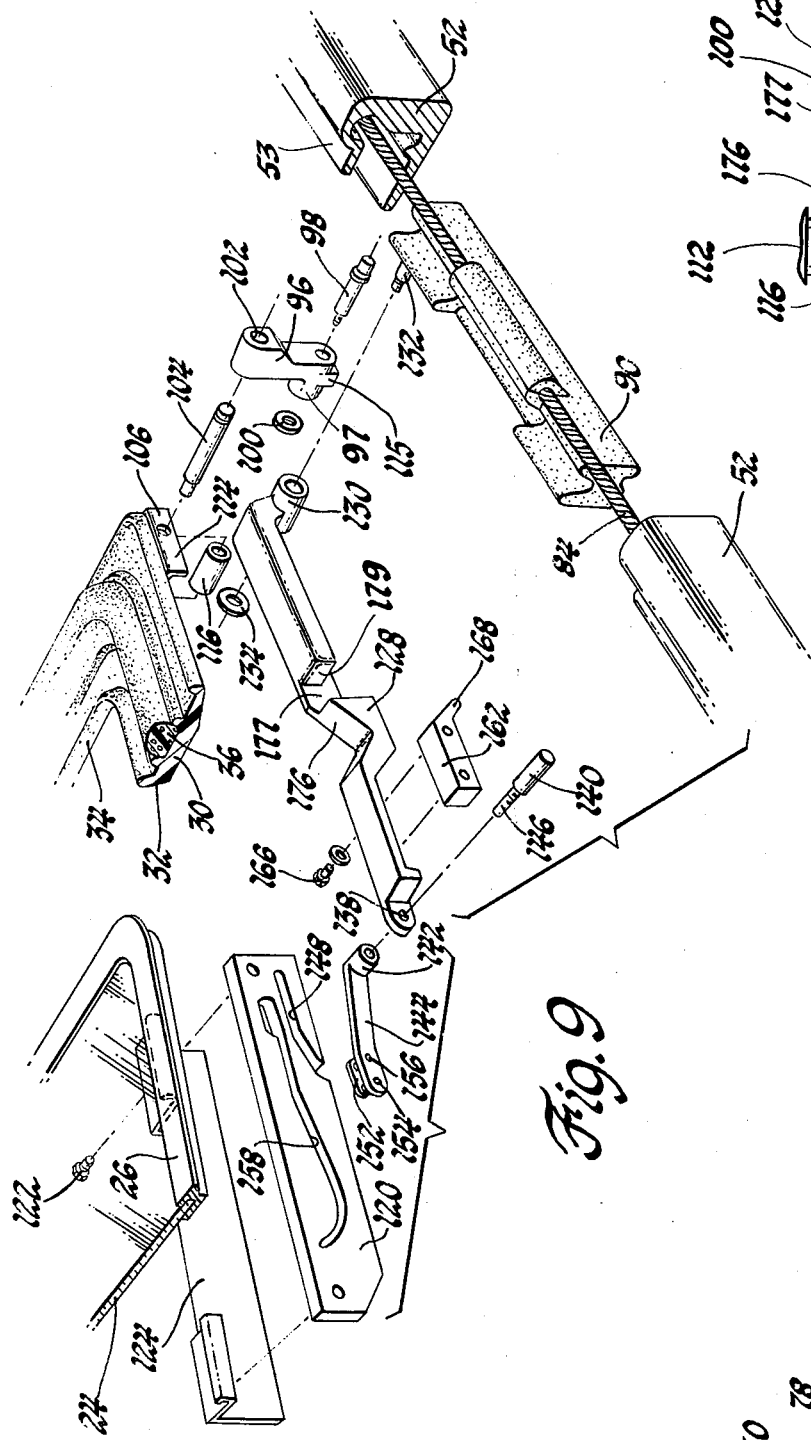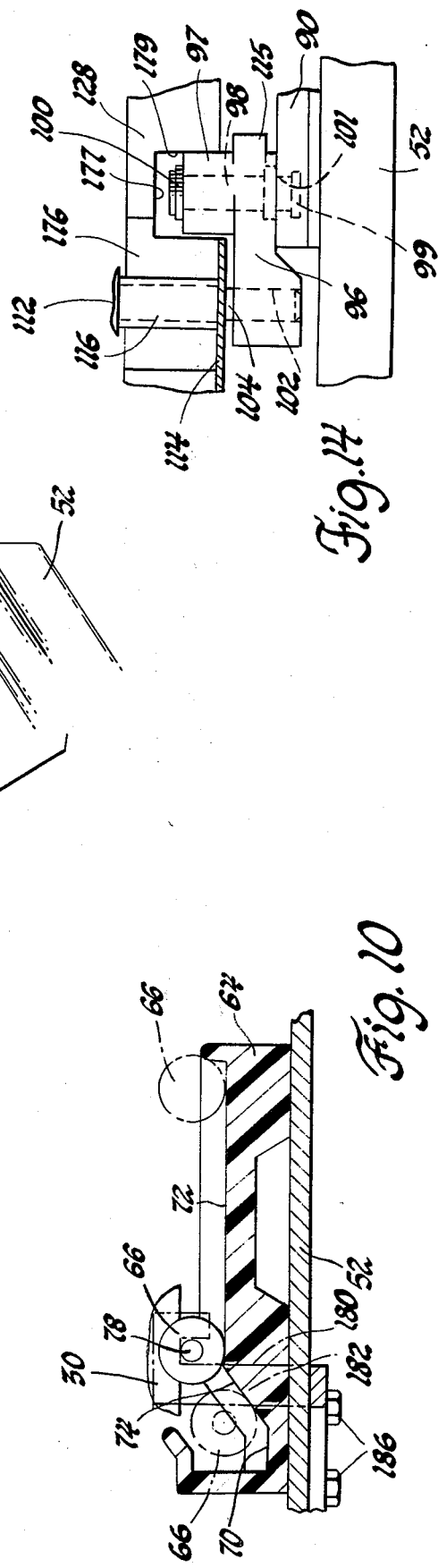

SLIDING SUNROOF WITH POWER OPERATED VENTILATOR

The invention relates to a vehicle body sunroof and more particularly provides a sunroof construction in which the sunroof closure is movable longitudinally of a roof opening to selectively open and close the roof opening and in which the closure panel is pivoted upward from the closed position to a ventilating position.

BACKGROUND OF THE INVENTION

It is well-known to provide a vehicle body roof panel having a roof opening which is selectively opened and closed by a metal or glass closure panel. Such closure panels are conventionally operated by a track assembly which moves the closure panel fore and aft between a closed position and an open position.

A preferred closure panel operating mechanism disclosed in U.S. Pat. No. 3,981,531, Koral et al., issued Sept. 21, 1976, raises the closure panel vertically against a downwardly facing roof flange defining the roof opening so that a seal is vertically compressed between the closure panel and the flange to provide a watertight occupant compartment.

Another type of prior art sunroof provides a power driven closure panel operating mechanism which pivotally raises the rear portion of the closure panel from the closed position to a ventilator position as well as bodily moving the closure panel fore and aft between open and closed positions. A shortcoming of this prior art sliding sunroof and ventilator construction is the difficulty of providing a watertight seal between the closure panel and the roof panel edges while still permitting articulation of the closure panel between the ventilator position, the closed position, and the open position. Accordingly, a water channel and drain tubes are employed to capture and dispose of water which leaks past the interface between the closure panel and roof panel edges.

It would be desirable to provide a vehicle body sunroof construction in which a vertically compressed seal is employed for optimum water tightness and yet the sunroof closure panel can be raised and lowered above and below the roof panel as desired to establish the sunroof panel in either an angularly raised venting position, a closed position sealed to the roof panel or a longitudinally retracted open position.

U.S. patent application Ser. No. 200,924 by Joseph F. Koral et al., filed Oct. 27, 1980, (and now U.S. Pat. No. 4,342,482), provides a veicle body sunroof construction in which a carrier frame having a power driven operating mechanism providing fore and aft movement is sealed to the vehicle body roof by a vertically compressed seal. A closure panel smaller than the roof opening is hingedly mounted on the carrier frame and moved between an angularly raised ventilator position and a closed position by a manually operated toggle linkage.

The present invention provides an improvement in the sliding sunroof with ventilator of Ser. No. 200,924 by the provision of cam linkage and lost motion connection which couples the power drive mechanism with the closure panel in a manner to provide power driven pivotal movement of the closure panel between the angularly raised ventilating position and the closed position.

SUMMARY OF THE INVENTION

According to this invention, a sunroof for a roof opening defined by a downward facing roof flange includes a rectangular carrier frame which underlies the roof flange and has a central sunroof opening therein. A glass closure panel is connected to the front of the carrier frame by hinges permitting pivoting of the closure panel to an angularly raised ventilator position. A seal mounted on the carrier frame is adapted for vertically compressed sealing engagement with both the roof flange and the closure panel. A track extends longitudinally along each side of the roof opening. A rear guide block slidable along the track is connected to the carrier frame by a lifter link which is pivoted to the carrier frame and stands vertically upright to hold the carrier frame closed against the roof panel and compress the seal therebetween. The lifter link is connected to the rear guide block by a pin and slot connection which permits the lifter link to remain vertically upright and stationary while the rear guide block is driven further forward. A linkage is pivoted to the rear guide block and connects with a cam block attached to the closure panel so that further forward movement of the guide block after the lifter link stops at the vertical upright position causes the linkage to raise the cam block and accordingly pivot the closure panel to an angularly raised ventilating position. Rearward movement of the guideblock from the closed position collapses the lifter link to lower the carrier frame and tow the carrier frame and closure panel rearwardly to a stored position beneath the vehicle roof.

BRIEF DESCRIPTION OF THE DRAWINGS

These and other objects, features and advantages of the invention will become apparent from consideration of the specification and the appended drawings in which:

FIG. 1 is a longitudinal sectional view through a vehicle roof having the power driven sliding sunroof and ventilator and showing the sunroof in the normal closed position;

FIG. 2 is a sectional view similar to FIG. 1 but showing the closure panel angularly raised to the ventilating position;

FIG. 3 is a sectional view similar to FIGS. 1 and 2 but showing the closure panel moved vertically downward and rearwardly to an open position;

FIG. 9 is an exploded perspective view of the rear corner of the sunroof;

FIG. 10 is an enlarged fragmentary view of the ramp member for vertically lifting the front corner of the sunroof;

FIG. 14 is a sectional view taken in the direction of arrows 14—14 of FIG. 13.

DESCRIPTION OF THE PREFERRED EMBODIMENT

Figure 4:
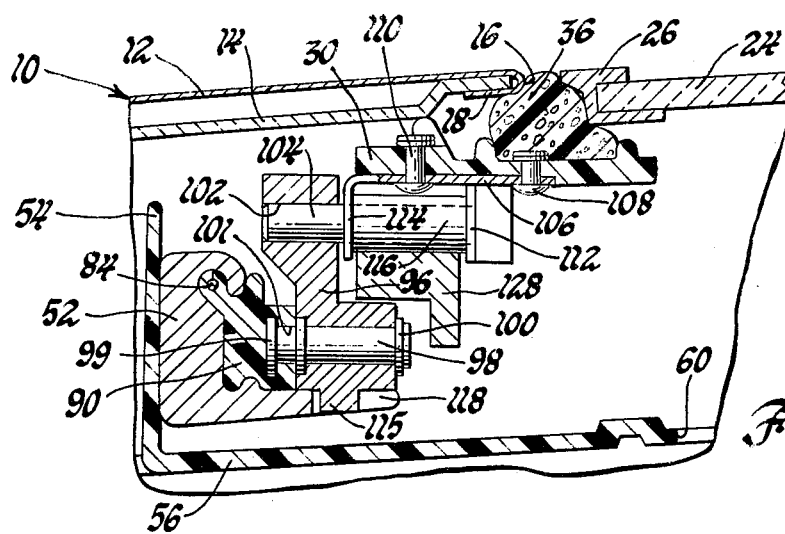
FIG. 4 is a sectional view taken in the direction of arrows 4—4 of FIG. 1.

Referring to FIG. 1, a vehicle body roof structure indicated generally at 10 includes an outer panel 12 and an inner panel 14. A roof opening 16 is provided by a flange 18 of the outer panel 12 which is folded over the inner panel 14 and faces downwardly into the vehicle passenger compartment.

A closure panel 22 comprised of a tinted glass panel 24 framed by a perimeter channel 26 is slightly smaller than the size of the roof opening 16 and is mounted on a carrier frame 30. The carrier frame 30, preferably of molded plastic construction, has an outside dimension greater than the roof opening 16 so that it underlies the roof flange 18. The carrier frame 30 also has an inner wall 32 which defines a sunroof opening 34 smaller than the closure panel 22 so that the carrier frame 30 also underlies the perimeter channel 26.

Figure 5:
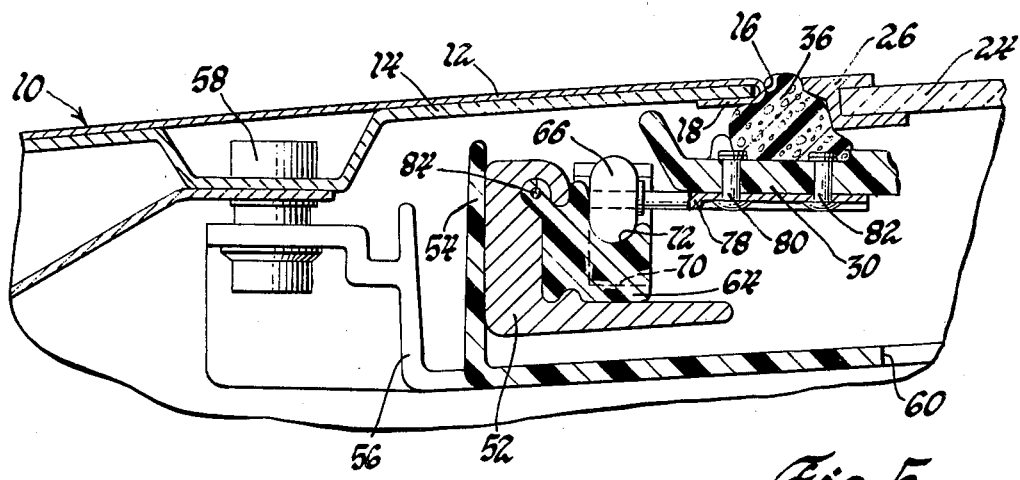
FIG. 5 is a sectional view taken in the direction of arrows 5—5 of FIG. 1.
Figure 8:
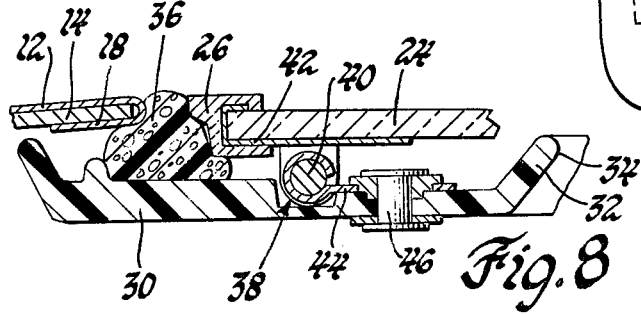
FIG. 8 is a sectional view taken in the direction of arrows 8—8 of FIG. 7.

As best seen in FIGS. 4, 5 and 8, a resilient compressible seal 36 is mounted on the carrier frame 30 and is vertically compressed between the carrier frame 30 and both the roof flange 18 and the closure panel perimeter channel 26.

Figure 7:
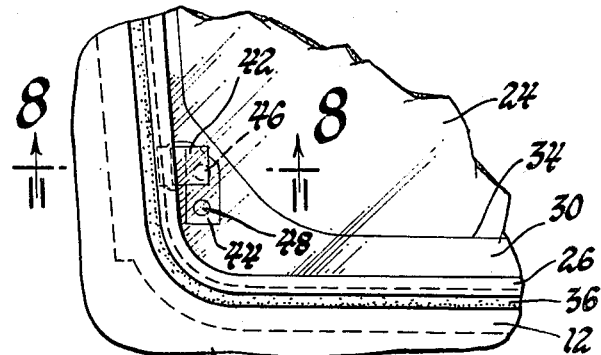
FIG. 7 is a plan view taken in the direction of arrows 7—7 of FIG. 2.

Referring to FIGS. 7 and 8, it is seen that a hinge assembly acts between the closure panel 22 and the carrier frame 30 at the front corner thereof. Each of the hinge assemblies 38 includes a hinge pin 40 which is connected to the glass panel 24 by a bracket 42 which wraps around the edge of the glass panel beneath the perimeter channel 26. A hinge strap 44 encircles the hinge pin 40 and is attached to the carrier frame 30 by a pair of rivets 46 and 48.

An operating mechanism is provided for moving the closure panel 22 and the carrier frame 30 between the closed position of FIG. 1; the closure panel angularly raised ventilator position of FIG. 2; and the rearwardly retracted full open position of FIG. 3. The operating mechanism includes a pair of tracks which extend longitudinally of the vehicle along each side of the roof opening 16. The left-hand track 52 is best seen in FIGS. 1, 4 and 5. The tracks are preferably of extruded plastic or aluminum and are suitably attached to an upstanding wall 54 of a molded plastic frame module 56 which is suitably attached to the roof inner panel 14 by nut and bolt assemblies 58. The frame module 56 has a central rectangular opening 60 which registers with the sunroof opening 34 defined by the inner wall 32 of the carrier frame 30.

As best seen in FIGS. 1, 5 and 10, the forward end of the carrier frame 30 is connected to the track 52 by a front guide block 64 which is captured in the track 52 and a roller 66 which rests upon the guide block 64 and is attached to the carrier frame 30. More particularly, the front guide block 64 is constructed of injected molded plastic and has a lower dwell surface 70 and a raised dwell surface 72 which are connected by an inclined ramp surface 74. The roller 66 rests upon one of the surfaces of the front guide block 64 and is attached to the carrier frame 30 by an axle bracket 78 attached to the carrier frame 30 by rivets 80 and 82. A push-pull drive cable 84 is embedded in or otherwise suitably attached to the front guide block 64 and functions to pull the front guide block 64 forwardly along the track 52 or push the front guide block 64 rearwardly along the track. Fore and aft movement of the guide block 64 relative the roller 66 will function to raise and lower the front end of the carrier frame 30 and closure panel 22 as will be further discussed hereinafter.

Referring to FIGS. 1, 4 and 9, there is shown a rear guide block 90 of injection molded plastic which is slidably captured for fore and aft movement along the track 52. The rear guide block 90 has the drive cable 84 embedded or otherwise suitably affixed thereto so that the front and rear guides are drivably interconnected at a fixed distance therebetween.

As best seen in FIGS. 4 and 9 the rear guide block 90 is connected to the rear corner of the carrier frame 30 by a lifter link 96. The lower end of the lifter link 96 has a cylindrical boss 97 connected to the rear guide block 90 by a pivot pin 98 having a headed end 99 which is slidably captured within a longitudinally extending guide slot 101 of the rear guide block 90. The pin 98 extends through an aperture in the lifter link and carries a snap retainer 100. The upper end of the lifter link 96 has a bore 102 which receives the end of a shaft 104. A mounting bracket 106 is attached to the carrier frame 30 by rivets 108 and 110 and has downturned legs 112 and 114 which are apertured to receive the shaft 104. A sleeve 116 is mounted on the shaft 104 between the downturned legs 112 and 114. The lifter link 96 can pivot relative the rear guide block 90 and the rear guide block 90 can move fore and aft relative the lifter link 96 and the carrier frame 30.

Figure 13:
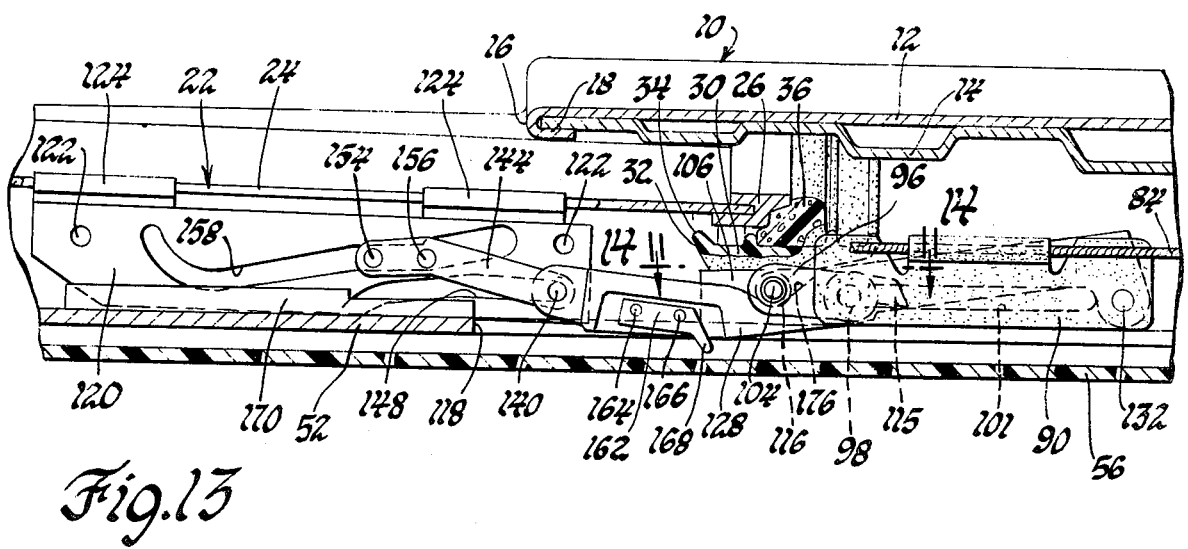
FIG. 13 is an enlarged fragmentary view similar to FIG. 3 but showing the closure panel moved vertically downward and rearwardly to a partially open position.

Referring to FIGS. 1, 2 and 4, it is seen that the lifter link 96 has a vertical upstanding position in which the carrier frame 30 is held in a position compressing the seal strip 36 between the carrier frame 30 and the roof flange 18. As best seen in FIG. 4, the lifter link 96 has a stop tab 115 which engages a lateral abutment 118 of the track 52 to prevent any forward movement of the lower end of the lifter link from the vertical upstanding position of FIGS. 1 and 11. Referring to FIGS. 3 and 13, it is seen that the lifter link 96 also has a generally horizontal position in which the carrier frame 30 is lowered below the vehicle roof 10.

Referring to FIGS. 1, 4 and 5, it is seen that the normal closed position of the closure panel 22 is obtained by the relative positions of the front guide block 64 and rear guide block 90 shown therein. The front guide block 64 is located at its forwardmost longitudinal position in which the roller 66 has rolled up the ramp surface 74 and is supported on the raised dwell surface 72. Accordingly, the front end of the carrier frame 30 is raised upwardly against the downwardly facing roof flange 18 to compress the seal 36 therebetween. The rear guide block 90 is located at its longitudinal position of FIG. 1 in which the lifter link 96 stands vertically upright to raise the rearward end of the carrier frame 30 upwardly against the downward facing roof flange 18 to compress the seal 36 in watertight sealing engagement therebetween.

Referring to FIG. 3, it will be understood that a rearward movement of the front guide block 64 and rear guide block 90 from the positions of FIG. 1 functions to lower the closure panel 22 below the roof 10 and then withdraw the closure panel 22 rearwardly to open the roof opening 16. More particularly, it is seen in FIGS. 3 and 10 that an initial rearward movement of the front guide block 64 will permit the roller 66 to roll down the inclined ramp 74 onto the lower dwell surface 70 so that the front end of the carrier frame 30 is dropped vertically away from the roof flange 18. The initial rearward movement of the rear guide block 90 pulls the lower end of the lifter link 96 rearwardly and collapses the lifter link 96 from the generally horizontal position of FIG. 3 so that the rearward end of the carrier frame 30 is lowered vertically away from the roof flange 18. Further rearward movement of the front guide block 64 and the rear guide block 90 progressively withdraws the closure panel 22 rearwardly to the position of FIG. 3 in which the closure panel 22 is stored beneath the roof 10.

A further description of the manner in which the closure panel operating mechanism moves the closure panel between the closed position of FIG. 1 and open position of FIG. 3 may be had by reference to U.S. Pat. No. 3,981,531, Koral et al., issued Sept. 21, 1976.

Figure 6:
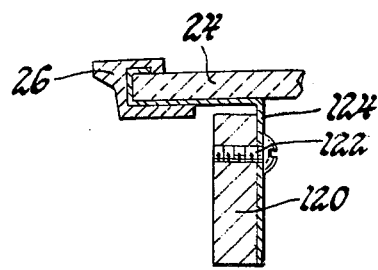
FIG. 6 is a sectional view taken in the direction of arrows 6—6 of FIG. 1.

Referring to FIG. 2, it is seen that additional mechanism is provided for raising the closure panel 22 to an angularly raised ventilating position. More particularly, as best seen in FIGS. 6 and 9, a cam block 120 is attached to the closure panel 22 by screws 122 and a bracket 124 which wraps around the edge of the glass panel 24 beneath the perimeter channel 26. A molded plastic operator link 128 has a boss 130 at its rearward end which is pivotally connected to the rear guide block 90 by a pin 132 and retaining ring 134. An aperture 138 at the forward end of the operator link 128 receives a cam pin 140 which extends through an apertured boss 142 and at the end of a vent link 144. A necked down cam follower portion 146 of the cam pin 140 extends into a cam slot 148 provided in the cam block 120. The vent link 144 also has a cam follower boss 152 comprised of cam pins 154 and 156 which are slidably captured within a cam slot 158 provided in the cam block 120. A ramp follower 162 is adjustably mounted on the operator link 128 by adjusting screws 164 and 166. The ramp follower 162 has a finger 168 which rides upon a stepped ramp 170 fixed upon the track 52.

Figure 11:
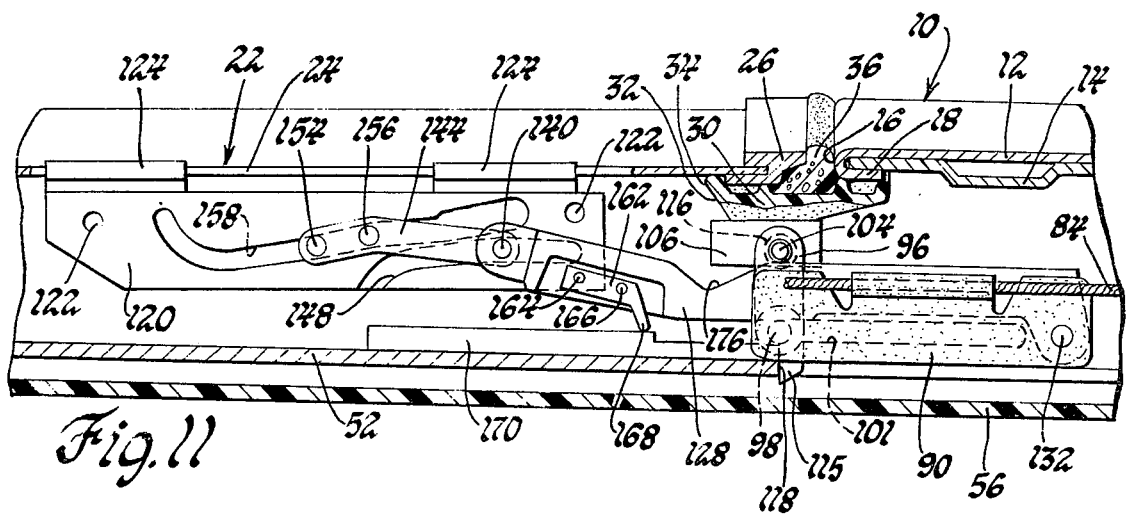
FIG. 11 is an enlarged fragmentary view of FIG. 1 showing the sunroof in a normal closed position.

Referring to FIG. 11, the closure panel 22 is shown in the normal closed position. The lifter link 96 is positioned at its normal vertical upstanding position having its stop tab 115 engaging the lateral abutment 118 of track 52 so that the carrier frame 30 is raised against the roof flange 18 and the seal 36 is compressed therebetween. The sleeve 116 mounted on the carrier frame 30 by the shaft 104 seats upon the top edge of the operator link 128 so the operator link acts upon the cam block 120 to hold the closure panel 22 downwardly with the seal 36 compressed between the perimeter channel 26 and the carrier frame 30.

Figure 12:
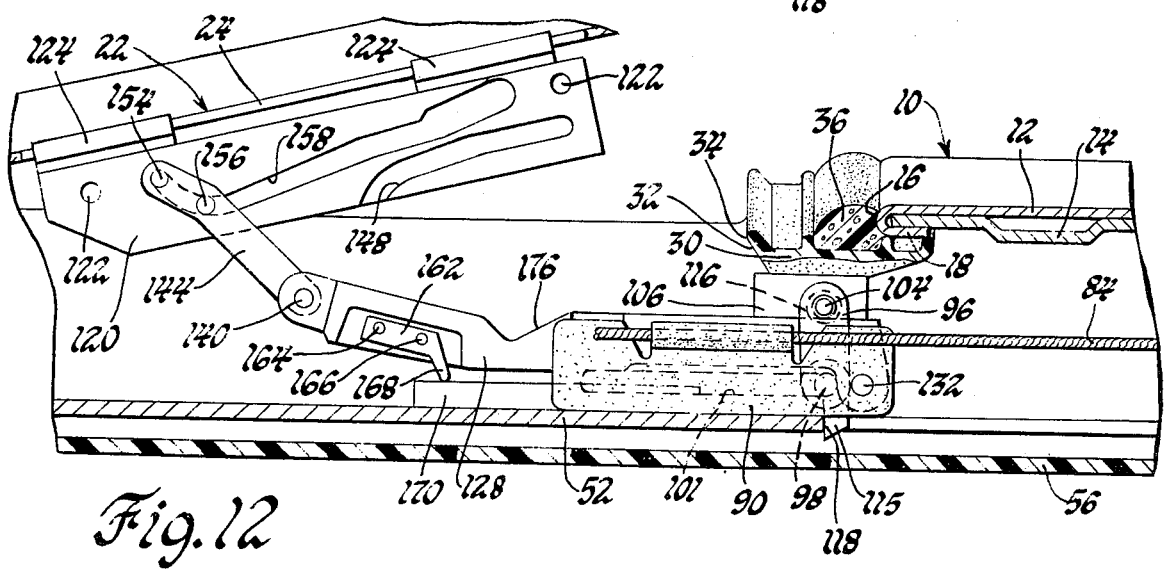
FIG. 12 is a fragmentary view of FIG. 2 and showing the closure panel angularly raised to the ventilating position.

Referring to FIG. 12, the occupant initiates power driven movement of the closure panel 22 to the angularly raised ventilator position by energizing a drive mechanism connected to drive cable 84 to drive the rear guide block 90 further foward from the position of FIG. 11. Referring to FIG. 12, it is seen that the lifter link 96 is retained at its vertical upstanding position by the engagement of its stop tab 115 with the lateral abutment 118 of the track 52. The longitudinal extending slot 101 of the guide block 90 forms a lost motion connection which permits the pin 98 of the lifter link to remain stationary with the lifter link while the rear guide block 90 is driven forward. During such forward movement of the drive cable 84, the front guide block is driven forward beneath the then stationary roller 66. The operator link 128 connected to the rear guide block by pin 132 is driven forward with the guide block and in turn drives the vent link 144 forwardly. As best seen by comparing FIGS. 11 and 12, this forward movement of the operator link 128 causes the cam pin 140 to travel forwardly along the cam slot 148 of the cam block 120. The cam pins 154 and 156 of the vent link 144 are simultaneously driven forward along the cam slot 158. The path of the cam slot 158 is curved so that the vent link 144 is guided to a vertical position shown in FIG. 12 which raises the closure panel 22 to an angularly raised position as permitted by pivoting movement of the closure panel 22 about the hinge assemblies 38 connecting the forward end of the closure panel with the carrier frame 30 as best shown in FIG. 8. The cam pin 140 of the operator link 128 exits the cam slot 148 to permit this movement of the closure panel 22 to the angularly raised position of FIG. 12. The finger 168 of the ramp follower 162 slides along the ramp 170 to support the operator link 128 against downward movement. As best seen in FIGS. 2 and 12, the pivotal movement of the closure panel 22 to the angularly raised position establishes a gap between the perimeter channel 26 of the closure panel and the carrier frame 30 so that air is ventilated from the occupant compartment.

The occupant initiates closure of the closure panel 22 from the ventilating position of FIG. 12 to the closed position of FIG. 11 by actuating the motor drive mechanism to move the drive cable 84 rearwardly. The rear guide block 90 is accordingly towed rearwardly and in turn tows the operator link 128 and the ventilator link 144 rearwardly. The ventilator link 144 is guided rearwardly along a path of bodily shifting movement as determined by travel of the cam pins 154 and 156 along the cam slot 158. The cam pin 140 enters the cam slot 148. The cam pin 140 cooperates with its cam slot 148 to cam the closure panel 22 downwardly into sealing engagement of its perimeter channel 26 with the seal 36 as the rear guide block 90 reaches its normal closed position of FIG. 11.

Referring to FIGS. 3 and 13, the closure panel is shown moved vertically downwardly and rearwardly to the open position. This movement of the closure panel is initiated by occupant actuation of the motor drive mechanism to move the drive cable 84 and the rear guide block 90 in the rearward direction. The pivot pin 98 at the lower end of the lifter link 96 engages with the end of the guide slot 101 so that the lower end of the lifter link 96 is towed rearwardly as shown in FIG. 13. This rearward movement of the lower end of the lifter link 96 collapses the lifter link to the generally horizontal position of FIG. 13 in which the sleeve 116 seats within an upwardly opening recess 176 defined in the operator link 128 so that the carrier frame 30 is lowered away from the roof flange 18. The ramp follower finger 162 rides off the ramp 170 so that the operator link 128 may pivot downwardly about the pin 132 and accordingly does not obstruct the downward movement of the closure panel 22 with the carrier frame 30. Upon such collapse of the lifter link 96 to the horizontal position and downward pivoting of the operating link 128 about the pin 132, the cylindrical boss 97 of the lifter link lower end becomes captured within a laterally opening recess 177 of the operating link 128 as shown in FIG. 14. Continued rearward movement of the rear guide block 90 causes the lifter link 96 to tow the carrier frame 30 rearwardly to a full rearward open and stored position as shown in FIG. 3.

Referring to FIGS. 3 and 13, it will be understood that the sunroof is moved from the fully open position of FIG. 3 to the nearly closed position of FIG. 13 by operator energization of the power drive mechanism to drive the rear guide block 90 forward along the track 52. During such forward movement of the rear guide block 90, the pin 98 cannot provide a forward driving connection between the guide block and the lifter link 96 because the pin 98 is situated at the rearward end of the longitudinal extending slot 101 of the guide block 90. However, the operator link 128 is moved forward in unison with the rear guide block 90 by the pin 132 and the lifter link 96 is in turn carried forwardly therewith by engagement of the forward facing shoulder 179 of the operator link recess 177 with the cylindrical boss 97 of the lifter link. During such forward movement of the lifter link 96 by the operator link 128, its movement from the horizontal to the vertical position is prevented by the weight of the carrier frame 30 and closure panel 24 which cause the sleeve 116 carried by the carrier frame 130 to rest within the recess 176 of the operator link 128. Furthermore, as best seen in FIG. 9, a hold-down lip 53 is provided integral with the track 52 continuously along its length rearwardly of the rear edge of the roof opening 16 and overlies the lifter link 96 to prevent the lifter link from pivoting upward.

Referring to FIG. 10, it is seen that when the closure panel 22 and carrier frame 30 are moved fully forward to register with the roof opening 16, the axle brackets 78 abut against a stop surface 180 of a stop bracket 182 mounted on the track 52 by screws 186. Accordingly, the carrier frame 30 is stopped against any further forward movement. Continued further forward movement of the drive cable 84 drives the front guide block 64 forwardly so that the ramp surface 74 of the front guide block 64 is driven beneath the roller 66 and raises the carrier frame 30 upwardly. The roller 66 comes to rest upon the raised dwell surface 72 of the front guide block so that the carrier frame 30 is held upwardly against the downward facing roof flange 18 to compress the seal 36 therebetween as seen in FIG. 5. Simultaneously, the forward movement of the rear guide block 90 and the operator link 128 therewith cause the ramp follower finger 168 to ride up on the ramp 170 and initiate vertical upward movement of the sleeve 116 carried by the carrier frame 30. Continued forward movement of the rear guide block causes the shoulder 179 of the operator link recess 177 to continue urging forward movement of the cylindrical boss 97 at the lower end of the lifter link 96. Ultimately, the lifter link 96 obtains the vertical position of FIG. 11 in which forward movement of the lower end of the lifter link 96 is stopped by the engagement of the stop tab 115 with the lateral abutment 118 of the track 52. The upward pivotal movement of the operator link 128 to the position of FIG. 11 causes the recess shoulder 179 of the operator link 128 to be raised above and disengage from the cylindrical boss 97 of the lifter link 96 so that the operator link 128 may move forwardly after the lifter link 96 is stopped to enable subsequent further forward movement of the operator link with the rear guide block as required to move to actuate the closure panel to the angularly raised ventilating position as discussed hereinbefore.

Thus, it is seen that the invention provides a new and improved vehicle sunroof structure in which a vertically compressed seal is employed for optimum water tightness and yet the sunroof closure panel can be power driven between raised and lowered positions above and below the roof panel as desired to establish the sunroof panel in either an angularly raised venting position, a closed position sealed to the roof panel, or a longitudinally retracted open position permitting open air communication between the passenger compartment and the out-of-doors.

The embodiments of the invention in which an exclusive property or privilege is claimed are defined as follows:

1. A vehicle body sunroof comprising:
   a roof panel having a roof opening;
   a carrier frame adapted to underlie the roof panel around the edge of the roof opening and having a carrier frame opening therein;
   a closure panel having a forward end pivotally mounted on the carrier frame so that the closure panel is pivotally movable between a closed position closing the carrier frame opening and an angularly raised ventilating position;
   a track extending alongside the roof opening;
   a guide block movable along the track by a drive mechanism;
   a lifter link pivotally connected to the rear end of the carrier frame and having a vertical upstanding position closing the carrier frame against the roof panel;
   means connecting the lifter link to the guide block to move the lower end of the lifter link rearwardly upon rearward guide block movement so that the lifter link collapses to lower the carrier frame below the roof panel and then moves the carrier frame rearwardly to open the roof opening, said connecting means also permitting forward movement of the guide block while the lifter link remains poised at the vertical upstanding position closing the carrier frame against the roof opening; and
   means interconnecting the guide block and the rearward end of the closure panel and adapted to pivot the closure panel to the angularly raised ventilating position upon forward movement of the guide block subsequent to the lifter link having attained the vertical upstanding position.

2. A vehicle body sunroof comprising:
   a roof panel having a roof opening;
   a carrier frame adapted to underlie the roof panel around the edge of the roof opening and having a carrier frame opening therein;
   a closure panel having a forward end pivotally mounted on the carrier frame so that the closure panel is pivotally movable between a closed position closing the carrier frame opening and an angularly raised open position;
   a track extending alongside the roof opening;
   a guide block movable along the track by a drive mechanism;
   a lifter link pivotally connected to the rear end of the carrier frame;
   lost motion connection means connecting the lifter link to the guide block to permit pivotal movement of the lifter link relative the guide block and limited fore and aft movement of the guide block relative to the lifter link;
   means acting to stop forward movement of the carrier frame from a stored position beneath the roof panel rearward the roof opening at a position registering the carrier frame with the roof opening so that continued forward movement of the guide block drives the lifter link to a vertical upstanding position raising the carrier frame against the roof panel in sealing engagement therewith;

stop means acting between the lifter link and the track to limit the lifter link against forward movement beyond the vertical upstanding position raising the carrier frame against the roof panel, said lost motion connection means between the lifter link and the guide block permitting further forward movement of the guide block;

and cam linkage means acting between the guide block and the rear end of the closure panel and adapted to pivot the closure panel to the angularly raised open position upon said further forward movement of the guide block relative to the lifter link.

3. A vehicle body sunroof comprising:

a roof panel having a roof opening;

a carrier frame adapted to underlie the roof panel around the edge of the roof opening and having a carrier frame opening therein;

a track extending alongside the roof opening;

a guide block movable along the track by a drive mechanism;

a lifter link pivotally connected to the rear end of the carrier frame and having a vertical upstanding position closing the carrier frame against the roof panel;

a closure panel having a forward end pivotally mounted on the carrier frame so that the closure panel and carrier frame are connected for unitary forward and rearward movement and the closure panel is pivotally movable between a closed position closing the carrier frame opening and an angularly raised ventilating position;

an operator link pivotally connected to the guide block for fore and aft movement therewith;

cam means acting between the operator link and the rear end of the closure panel so that the fore and aft position of the operator link and guide block establishes the closure panel in either the closed position closing the carrier frame opening or the angularly raised ventilating position;

lost motion connection means connecting the lifter link to the guide block and effective to collapse the lifter link from the vertical upstanding position upon initial rearward movement of the guide block from the position in which the carrier frame is closed against the roof panel and the closure panel closes the carrier frame opening, said collapse of the lifter link from the vertical position being effective to lower the carrier frame and closure panel away from the roof panel to enable rearward movement of the carrier frame and closure panel with the guide block to a position stowed beneath the vehicle roof to open the roof opening;

and drive connecting means effective when the lifter link is collapsed to drivingly connect the carrier frame with the guide block independently of the lost motion connection to enable subsequent forward movement of the carrier frame and closure panel from the stowed position in unison with forward movement of the guide block.

4. A vehicle body sunroof comprising:

a roof panel having a roof opening;

a carrier frame adapted to underlie the roof panel around the edge of the roof opening and having a carrier frame opening therein;

a closure panel having a forward end pivotally mounted on the carrier frame so that the closure frame is pivotally movable between a closed position closing the carrier frame opening and an angularly raised open position;

a track extending along side the roof opening;

a guide block movable along the track by a drive mechanism;

a lifter link pivotally connected to the rear end of the carrier frame and having a vertical upstanding position closing the carrier frame against the roof panel;

lost motion connection means connecting the lifter link to the guide block to permit pivotal movement of the lifter link relative the guide block and limited fore and aft movement of the guide block relative the lifter link, said lost motion connection means being effective to collapse the lifter link from the vertical upstanding position to a generally horizontal position upon initial rearward movement of the guide block to lower the carrier frame and closure panel away from the roof panel and thereby enable rearward movement of the carrier frame and closure panel with the guide block to a position stowed beneath the roof to open the roof opening;

an operator link pivotally connected to the guide block for fore and aft movement therewith, said operator link adapted to drivingly interconnect with the lifter link when the lifter link is collapsed to the horizontal position so that the operator link drives the lifter link and carrier frame forwardly upon forward movement of the guide block from the stowed position to move the carrier frame and closure panel forwardly to register with the roof opening;

ramp means acting on the operator link upon approach of the carrier frame to the position registering with the roof opening and adapted to initiate movement of the lifter link from the generally horizontal position to the vertical upstanding position upon continued forward movement of the guide block and operator link until the return of the lifter link to the vertical upstanding position terminates the driving interconnection of the operator link with the lifter link;

stop means acting between the lifter link and the track to limit the lifter link against forward movement beyond the vertical upstanding position raising the carrier frame against the roof panel;

and cam means acting between the operator link and the rear end of the closure panel so that a further forward movement of the guide block and operator link relative the stopped lifter link as permitted by the lost motion connection between the lifter link and the guide block is effective to pivotally raise the closure panel to the angularly raised ventilating position.

* * * * *